(12) United States Patent
Motokawa

(10) Patent No.: US 11,260,275 B2
(45) Date of Patent: Mar. 1, 2022

(54) GOLF CLUB HEAD AND METHOD OF MANUFACTURING SAME

(71) Applicant: Sumitomo Rubber Industries, Ltd., Hyogo (JP)

(72) Inventor: Yuki Motokawa, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

(21) Appl. No.: 16/677,933

(22) Filed: Nov. 8, 2019

(65) Prior Publication Data

US 2020/0171361 A1 Jun. 4, 2020

(30) Foreign Application Priority Data

Nov. 29, 2018 (JP) .............................. JP2018-223909

(51) Int. Cl.
*A63B 53/04* (2015.01)
*B23K 31/02* (2006.01)

(52) U.S. Cl.
CPC ............ *A63B 53/047* (2013.01); *B23K 31/02* (2013.01); *A63B 53/0433* (2020.08); *A63B 2053/0491* (2013.01)

(58) Field of Classification Search
CPC .............. A63B 53/047; A63B 53/0433; A63B 2053/0491; B23K 31/02
See application file for complete search history.

(56) References Cited

U.S. PATENT DOCUMENTS

| | | | | |
|---|---|---|---|---|
| 6,186,905 B1* | 2/2001 | Kosmatka | .............. | A63B 60/00 473/291 |
| 2003/0236134 A1* | 12/2003 | Nishitani | ............. | A63B 53/047 473/349 |
| 2005/0054458 A1* | 3/2005 | Chen | ...................... | A63B 60/02 473/291 |
| 2006/0293114 A1* | 12/2006 | Chen | ...................... | A63B 60/02 473/290 |
| 2009/0239681 A1* | 9/2009 | Sugimoto | ............ | A63B 53/047 473/350 |

(Continued)

FOREIGN PATENT DOCUMENTS

JP 2018-000470 A 1/2018

OTHER PUBLICATIONS

Welding of Dissimilar Metals, Total Materia at https://www.totalmateria.com/page.aspx?ID=CheckArticle&site=ktn&NM=152, Aug. 2006.*

*Primary Examiner* — William M Pierce
(74) *Attorney, Agent, or Firm* — Studebaker & Brackett PC

(57) ABSTRACT

A golf club head 1 has a first wall portion comprising a first member made of first material, a second member made of second material, and a third member made of material. The third material's specific gravity is different from the first material's specific gravity and second material's specific gravity. The weldability between the first material and second material is superior to the weldability between the first material and third material. The first member is fixed to the second member by welding. The third member is fixed to the first member by using the second member. The third member comprises a portion continuous from a first surface to an opposite second surface of the first wall portion in the thickness direction of the first wall portion.

11 Claims, 18 Drawing Sheets

(56) References Cited

U.S. PATENT DOCUMENTS

| | | | |
|---|---|---|---|
| 2009/0305815 A1* | 12/2009 | Hirano | A63B 53/047 |
| | | | 473/350 |
| 2016/0193508 A1* | 7/2016 | Issertell | A63B 60/00 |
| | | | 473/342 |
| 2017/0312590 A1* | 11/2017 | Nakamura | A63B 53/047 |
| 2018/0001157 A1 | 1/2018 | Abe et al. | |
| 2018/0200590 A1* | 7/2018 | Evans | A63B 53/06 |
| 2018/0221737 A1* | 8/2018 | Morales | A63B 53/04 |

\* cited by examiner

GOLF CLUB HEAD AND METHOD OF MANUFACTURING SAME

TECHNICAL FIELD

The present invention relates to a golf club head made of a plurality of materials having different specific gravities and a method of manufacturing the same.

BACKGROUND ART

In order to design the center of gravity of a golf club head at a desired position, the golf club head may be formed using a first metal material and a second metal material having a specific gravity different from that of the first metal material. In general, when the specific gravity difference between two materials increases, it becomes difficult to form a welded joint having sufficient strength between the two materials because their common chemical components are reduced.

Patent Document 1 below discloses a golf club head comprising a head main body, a weight member and a fixing member. The weight member is made of a material with a large specific gravity difference from the head main body, so it cannot be welded to the head main body.

For this reason, in the above-mentioned golf club head, the weight member is arranged in a recess provided in the head main body, and the fixing member is fixed to the head main body by welding so as to cover the weight member.

Patent Document 1: Japanese Patent Application Publication No. JP2018-000470

SUMMARY OF THE INVENTION

Problems to be Solved by the Invention

In the golf club head of the above-mentioned Patent Document 1, since the weight member is accommodated and arranged inside the head main body, there are restrictions such as being inevitably downsized when designing the shape of the weight member. As a result, with the conventional technique, it is difficult to concentrate a larger mass at a desired specific position.

The present invention has been devised in view of the above-described circumstances, and a main objective is to provide a golf club head and a manufacturing method thereof, in which, by improving the arrangement of a metal material having a large specific gravity difference, a greater mass change is provided at a specific position, and thereby it is possible to further lower the position of the center of gravity, for example.

According to one aspect of the present invention, a golf club head comprises a first wall portion, the first wall portion comprising a first member made of a first material, a second member made of a second material, and a third member made of a third material,
wherein
the third material's specific gravity is different from the first material's specific gravity and the second material's specific gravity,
the weldability between the first material and the second material is superior to the weldability of the first material and the third material,
the first member is fixed to the second member by welding,
the third member is fixed to the first member by using the second member,
the third member includes a continuous portion which is continuous from a first surface to a second surface of the first wall portion which surfaces are on one side and the opposite side, respectively, in the thickness direction of the first wall portion.

The third member may be fixed to the second member.
The third member may be sandwiched between the first member and the second member.
The golf club head may include a face portion and a sole wall portion extending backward of the head from a lower part of the face portion, and the first wall portion may be the sole wall portion.

The first material's specific gravity $\rho 1$, the second material's specific gravity $\rho 2$, and the third material's specific gravity $\rho 3$ may satisfy the following condition (1):

$$\rho 1 < \rho 2 < \rho 3 \tag{1}$$

The first material's specific gravity $\rho 1$, the second material's specific gravity $\rho 2$, and the third material's specific gravity $\rho 3$ may satisfy the following condition (2):

$$\rho 1 = \rho 2 < \rho 3 \tag{2}$$

The first material's specific gravity $\rho 1$, the second material's specific gravity $\rho 2$, and the third material's specific gravity $\rho 3$ may satisfy the following condition (3):

$$\rho 2 < \rho 1 < \rho 3 \tag{3}$$

The third material and the first material may be metal materials that cannot be welded to each other.
The difference in the specific gravity between the third material and the first material may be 3.0 or more.
The third member may be integrated with the second member by sinter bonding.
The third member may be fixed to the second member by welding.
It may be possible that the first member is provided with a first hole, the second member is fixed to the first hole by welding, the second member is provided with a second hole, and the third member includes an insert portion placed in the second hole.
The third member may further include a protruding portion that protrudes outward from the second hole and is fixed to one side of the second member in the thickness direction of the first wall portion.
Aperture areas of the first hole and the second hole, respectively, may decrease toward the same direction in the thickness direction of the first wall portion.
Aperture areas of the first hole and the second hole, respectively, may decrease toward different directions in the thickness direction of the first wall portion.
The third member may be held by the second member in a cantilever manner so as to extend backward of the head.
The golf club head may include a face portion and a crown wall portion extending backward of the head from an upper part of the face portion, and the first wall portion may be the crown wall portion.
The first material's specific gravity $\rho 1$, the second material's specific gravity $\rho 2$, and the third material's specific gravity $\rho 3$ may satisfy the following condition (4):

$$\rho 1 > \rho 2 > \rho 3 \tag{4}$$

According to another aspect of the present invention, a method of manufacturing a golf club head having a first wall portion, comprises the steps of:
making a part of the first wall portion from a first member made of a first material;
making an assembly of a second member made of a second material and a third member made of a third material by uniting the second member with the third member, wherein the third material has a specific gravity different from the first material and the second material, and weldability between the first material and the third material is inferior to weldability between the first material and the second material, and
fixing the first member to the second member of the assembly by welding so that the third member is provided with a continuous portion which is continuous from a first surface to a second surface of the first wall portion which surfaces are on one side and the opposite side, respectively, in the thickness direction of the first wall portion.

According to still another aspect of the present invention, a method of manufacturing a golf club head having a first wall portion, comprises the steps of:

making a part of the first wall portion from a first member made of a first material;

preparing a second member made of a second material and a third member made of a third material, wherein the third material has a specific gravity different from the first material and the second material, and weldability between the first material and the third material is inferior to weldability between the first material and the second material;

sandwiching the third member between the first member and the second member so that the third member is provided with a continuous portion which is continuous from a first surface to a second surface of the first wall portion which surfaces are on one side and the opposite side, respectively, in the thickness direction of the first wall portion; and fixing the first member to the second member by welding while the third member is being sandwiched therebetween.

According to the present invention, the first wall portion of the golf club head includes the first member made of the first material, the second member made of the second material, and the third member made of the third material. The third material's specific gravity is different from the first material's specific gravity and the second material's specific gravity. Also, the weldability between the first material and the second material is superior to the weldability between the first material and the third material.

In the present invention, using such relationships, the first member is fixed to the second member by welding, but the third member is fixed to the first member by using the second member. Thus, for example, even in a combination of the first material and the third material where the specific gravity difference is increased to the extent that welding becomes difficult, the third member can be fixed to the first member by the use of the second member.

The third member made of the third material has the continuous portion from the first surface to the opposite second surface in the thickness direction of the first wall portion. Therefore, the third member is disposed in a wide range from the first surface to the second surface in the thickness direction of the first wall portion, and thus it is possible to provide a larger mass change at a specific position.

For example, if the third material's specific gravity is greater than that of the first material, the first wall portion can be provided with a greater mass. If the third material's specific gravity is smaller than the first material, the first wall portion can be provided with a smaller mass.

DESCRIPTION OF THE PREFERRED EMBODIMENTS

Figure 1:
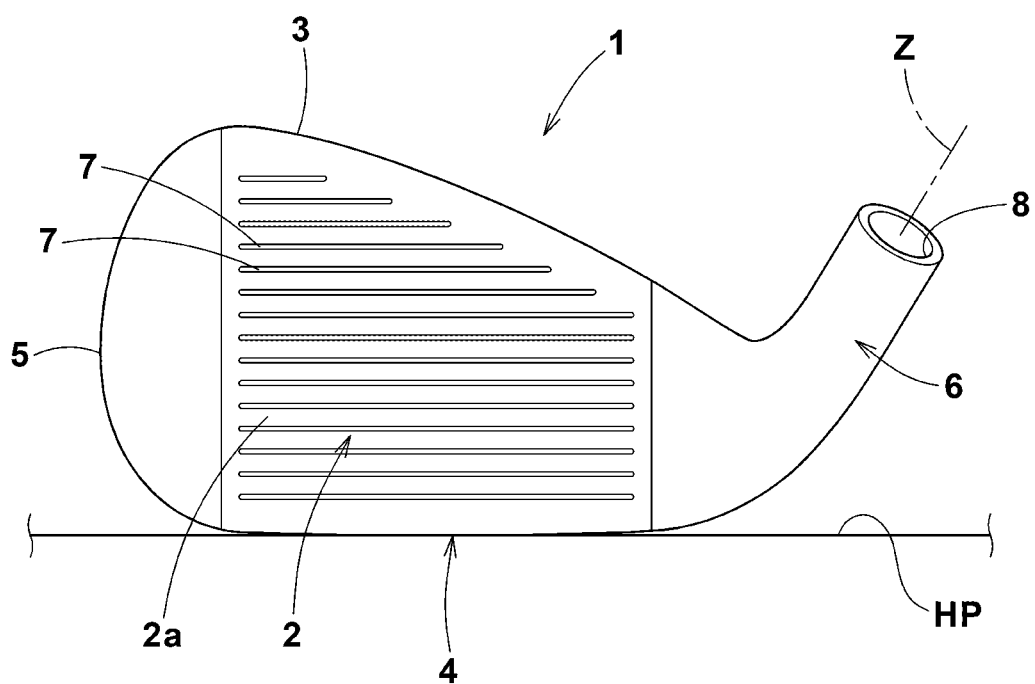
FIG. 1 is a front view of a golf club head showing a first embodiment of the present invention.

Hereinafter, a golf club head according to an embodiment of the present invention will be described with reference to the drawings together with respective steps of the manufacturing method thereof.

Specific configurations illustrated in the drawings and embodiments described in detail below are only for understanding the contents of the present invention, and the present invention is not limited to these specific configurations.

In the following description, the same or common elements are denoted by the same reference numerals, and redundant descriptions are omitted.

FIGS. 1-4 show a front view, rear view, bottom view and side view from the toe side, of the golf club head 1 of the present embodiment (hereinafter simply referred to as the "head").

As shown in FIGS. 1 to 4, the head 1 of the present embodiment is configured as a typical iron type golf club head.

The present invention is however, not limited to iron type golf club heads, but can be applied to wood type, utility type and putter type golf club heads.

[Head Posture]

In FIGS. 1 to 4, the head 1 is depicted as being under such a state that the head 1 is tilted so that the club face 2*a* becomes vertical. Hereinafter, this state is referred to as the "forward tilt state". The forward tilt state is obtained as follows.

Figure 17:
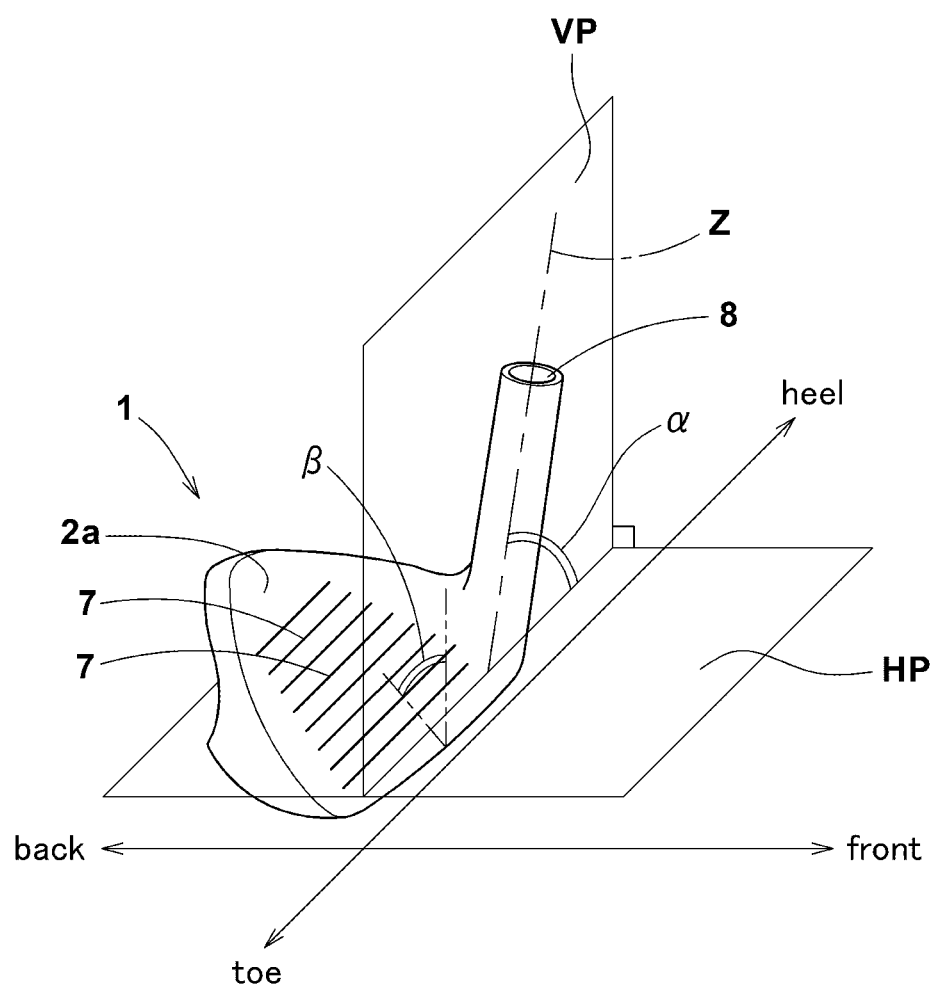
FIG. 17 is a perspective view for explaining a reference state of a golf club head.

First, the head 1 is brought into a reference state as shown in FIG. 17. The "reference state" of the head 1 means a state of the head 1 which is placed on a horizontal plane HP so that a center axis z (corresponding to the axis of the club shaft) of a shaft insertion hole 8 of the head 1 is laid in a reference vertical plane VP to have its specified lie angle α and loft angle β. The reference vertical plane VP is a plane perpendicular to the horizontal plane HP.

Then, the head 1 in the reference state is rotated around a reference horizontal axis which is parallel to the horizontal plane HP and parallel to the reference vertical plane VP, so that the club face 2a becomes vertical, namely, becomes parallel to the reference vertical plane VP. Thereby, the above-mentioned forward lean state is given.

[Directions of Head]

Referring to FIG. 17, the front side of the head 1 means the side of the club face 2a for hitting a ball in the reference state. The rear side or back side of the head 1 means the opposite side. The upper side and lower side of the head 1 mean the upper side and lower side in the vertical direction, respectively. The toe-heel direction of the head 1 means a horizontal direction orthogonal to the front-rear direction of the golf club head.

[Basic Shape of Head]

As shown in FIGS. 1 to 4, the head 1 of this embodiment having a typical iron shape comprises a face portion 2, a top portion 3, a sole wall portion 4, a toe 5 and a hosel 6.

The head 1 of this embodiment is made of, for example, a metal material or metal materials.

The front surface of the face portion 2 defines the club face 2a for hitting a ball. The club face 2a is provided with a plurality of grooves (score lines) 7 extending parallel to the toe-heel direction in order to increase friction with the ball.

The top portion 3 is an upper surface portion of the head 1 that extends rearward of the head from the upper edge of the club face 2a.

The toe 5 is the farthest portion from the hosel 6 and smoothly connects the top portion 3 and the sole wall portion 4.

The hosel 6 is a portion having a shaft insertion hole 8 to which a club shaft (not shown) is attached, and in this example, it is formed in a cylindrical shape, The center axis z of the shaft insertion hole 8 substantially coincides with the axis of the club shaft when the club shaft (not shown) is attached thereto.

Figure 2:
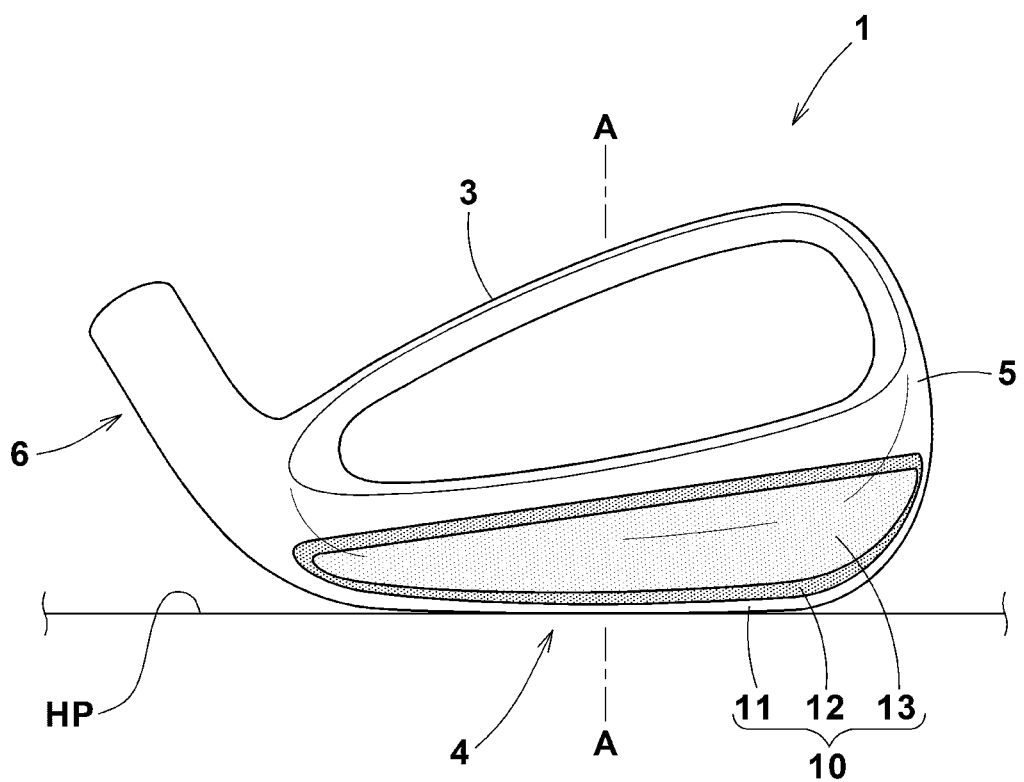
FIG. 2 is a rear view of the golf club head of FIG. 1.
Figure 3:
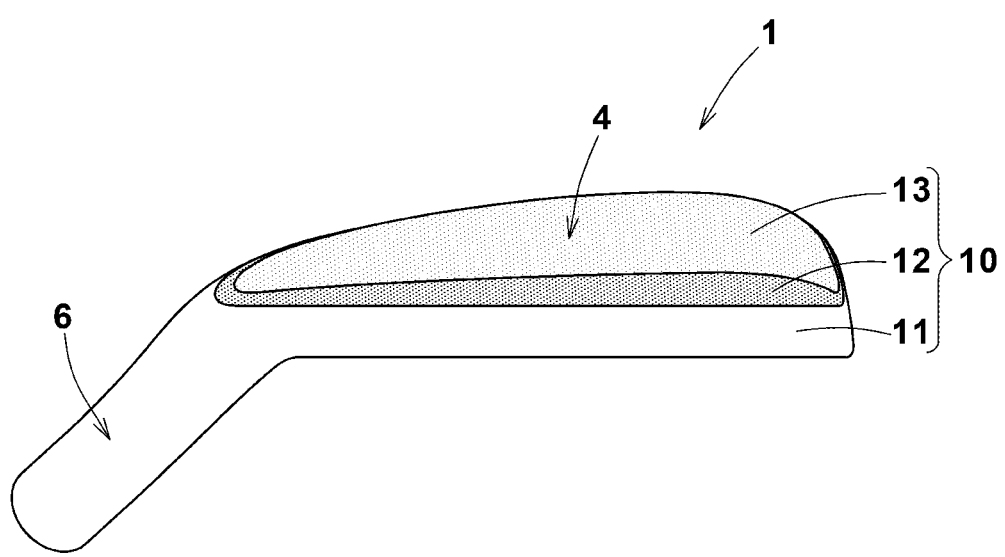
FIG. 3 is a bottom view of the golf club head of FIG. 1.
Figure 4:
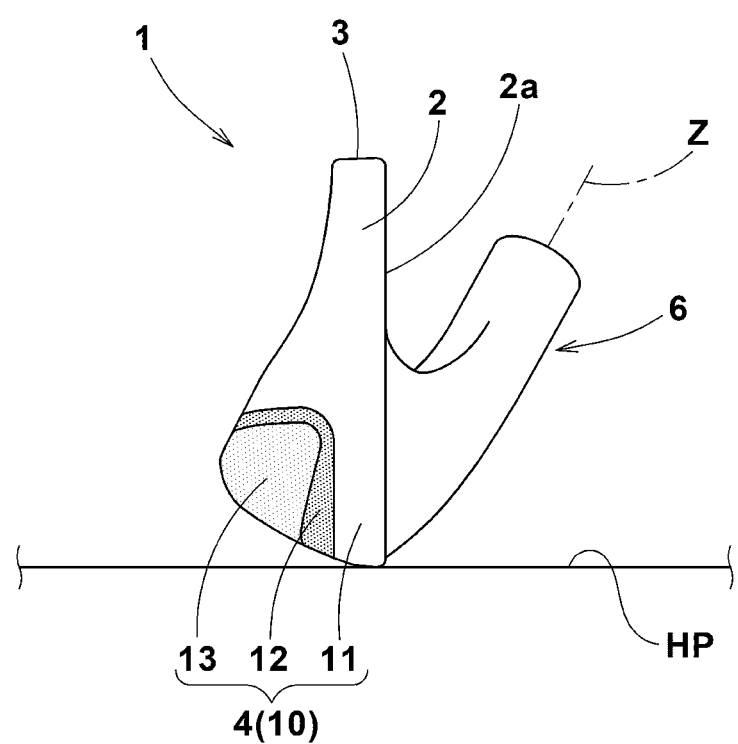
FIG. 4 is a side view of the golf club head of FIG. 1 viewed from the toe side.
Figure 5:
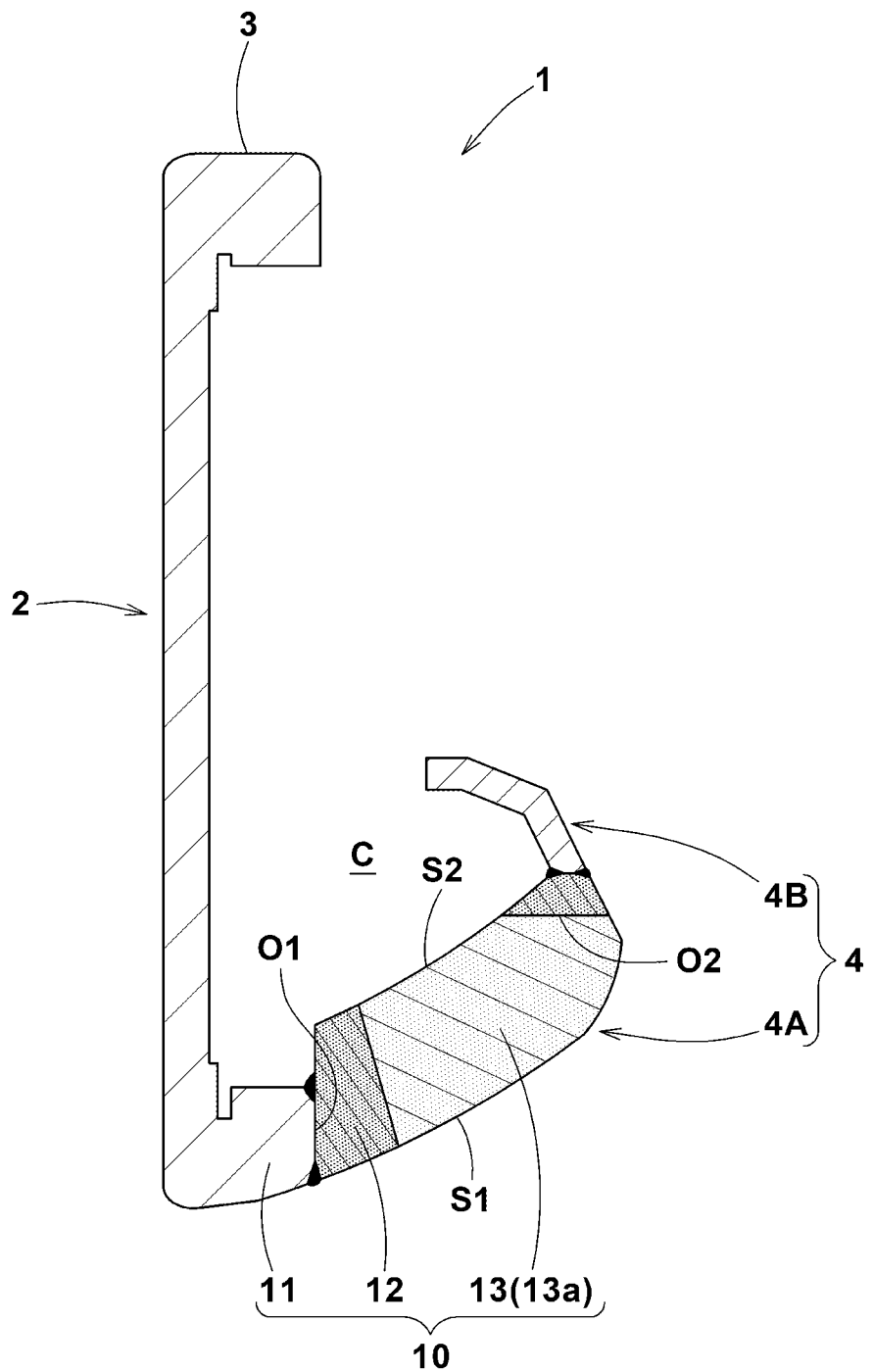
FIG. 5 is a cross-sectional view taken along line A-A in FIG. 2.

FIG. 5 is a sectional view taken along line A-A in FIG. 2. As shown in FIG. 5, the sole wall portion 4 is a portion on the bottom side, of the head 1 which extends backward of the head from a lower part of the face portion 2.

The sole wall portion 4 in this embodiment comprises a sole wall portion main body 4A extending backward of the head from the face portion 2, and a rising portion 4B extending upward of the head from the rear end of the sole wall portion main body 4A. The rising portion 4B is spaced apart from the back surface of the face portion 2 and terminates. As a result, the sole wall portion 4 is supported by the face portion 2 in a cantilever manner. Thereby, a pocket-shaped cavity C having an upper opening is formed between the face portion 2 and the sole wall portion 4.

[Configuration of First Wall Portion]

In the head 1 of this embodiment, the sole wall portion 4 constitutes a first wall portion 10 made from a plurality of materials having different specific gravities.

As shown in FIGS. 2 to 5, the first wall portion 10 comprises a first member 11 made of a first material, a second member made of a second material, and a third member made of a third material.

The third material's specific gravity ρ3 is different from the first material's specific gravity ρ1 and the second material's specific gravity ρ2.

The second material's specific gravity ρ2 is not particularly limited in relation to the first material's specific gravity ρ1, and may be the same or different from each other.

The 1st to 3rd materials have such a relationship that weldability between the 1st material and the 2nd material is better than weldability between the 1st material and the 3rd material.

In general, the greater the specific gravity difference between two metal materials, the lower the weldability between them.

In this embodiment, therefore, the difference (|ρ2−ρ1|) in the specific gravity between the first material and the second material is set to be smaller than the difference (|ρ3−ρ1|) in the specific gravity between the first material and the third material.

In the present embodiment, using the above-described relationship, the first member 11 is fixed to the second member 12 by welding.

In FIG. 5, the weld bead or fused metal for fixing the first member 11 and the second member 12 is shown in solid black. In the finished head 1, however, there is a possibility that such weld bead is hardly observed from the outside as the surface of the finished head is polished off.

On the other hand, the third member 13 is fixed to the first member 11 using the second member 12.

Here, the expression "using the second member 12" means that the second member 12 is involved in fixing the third member 13 to the first member 11 in some way as explained later.

Therefore, even if the difference (|ρ3−ρ1|) in the specific gravity between the first material and the third material is increased to the extent that welding is difficult therebetween, for example, the third member 13 can be fixed to the first member 11 by a method other than welding, using the second member 12.

In addition, by fixing the third member 13 to the first wall portion 10, the third member 13 has a continuous portion which is continuous from a first surface S1 to a second surface S2 of the first wall portion 10, which are a surface on one side in the thickness direction of the first wall portion 10, and the opposite other surface of the first wall portion 10, respectively.

Therefore, the third member 13 is arranged in a wide range from the first surface S1 to the second surface S2 in the thickness direction of the first wall portion 10, and thus can provide a larger mass change.

For example, if the third material's specific gravity ρ3 is larger than the first material's specific gravity ρ1, then the first wall portion 10 can be provided with a greater mass. If the third material's specific gravity ρ3 is smaller than the first material's specific gravity ρ1, then the first wall portion 10 can be provided with a smaller mass.

Hereinafter, some more specific preferred embodiments will be described with respect to the first wall portion 10, and also the first member 11, second member 12 and third members 13 constituting the first wall portion 10.

First Embodiment

A first embodiment is, for example, suitable for lowering the position of the center of gravity of the head 1.

Figure 6:
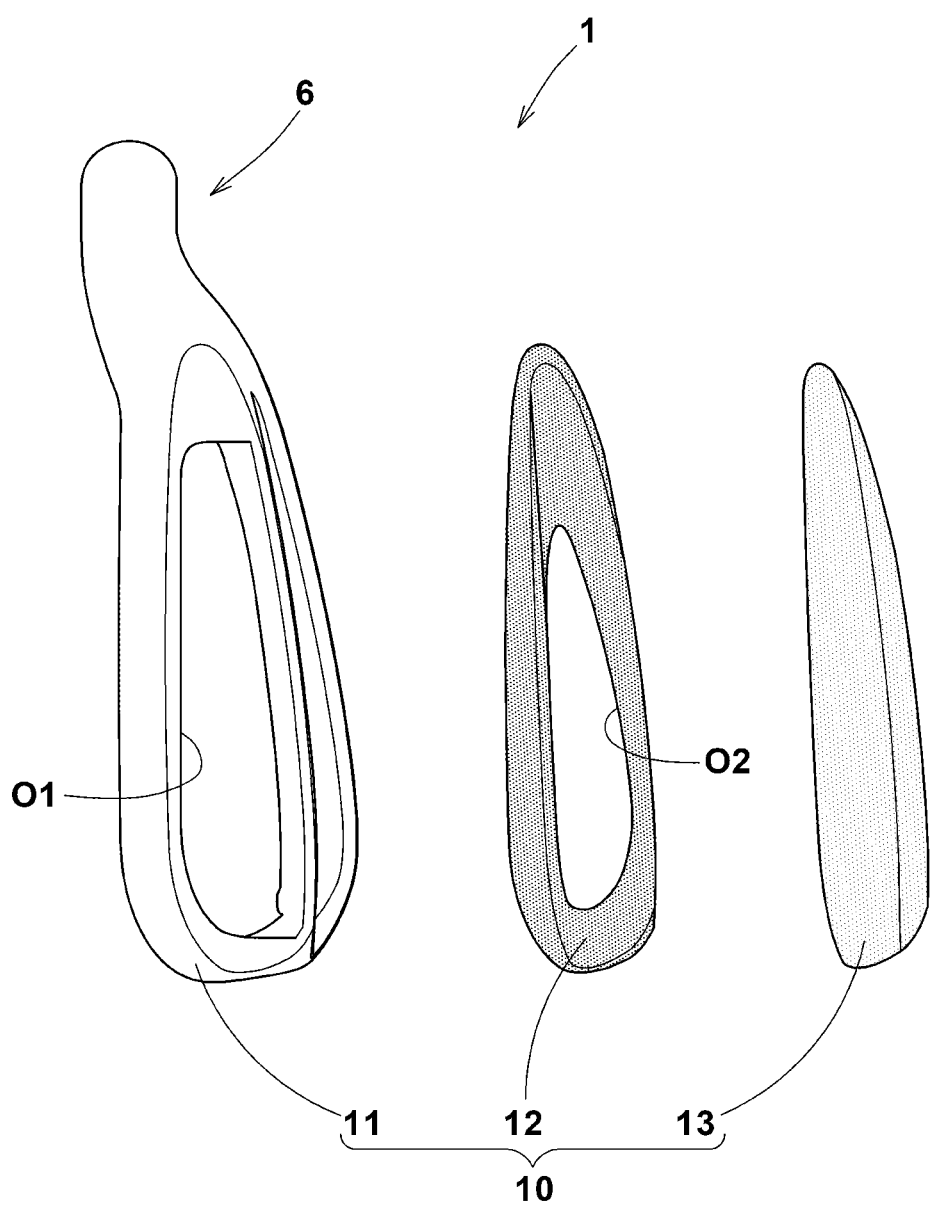
FIG. 6 is an exploded bottom view of the golf club head of FIG. 1.
Figure 7:
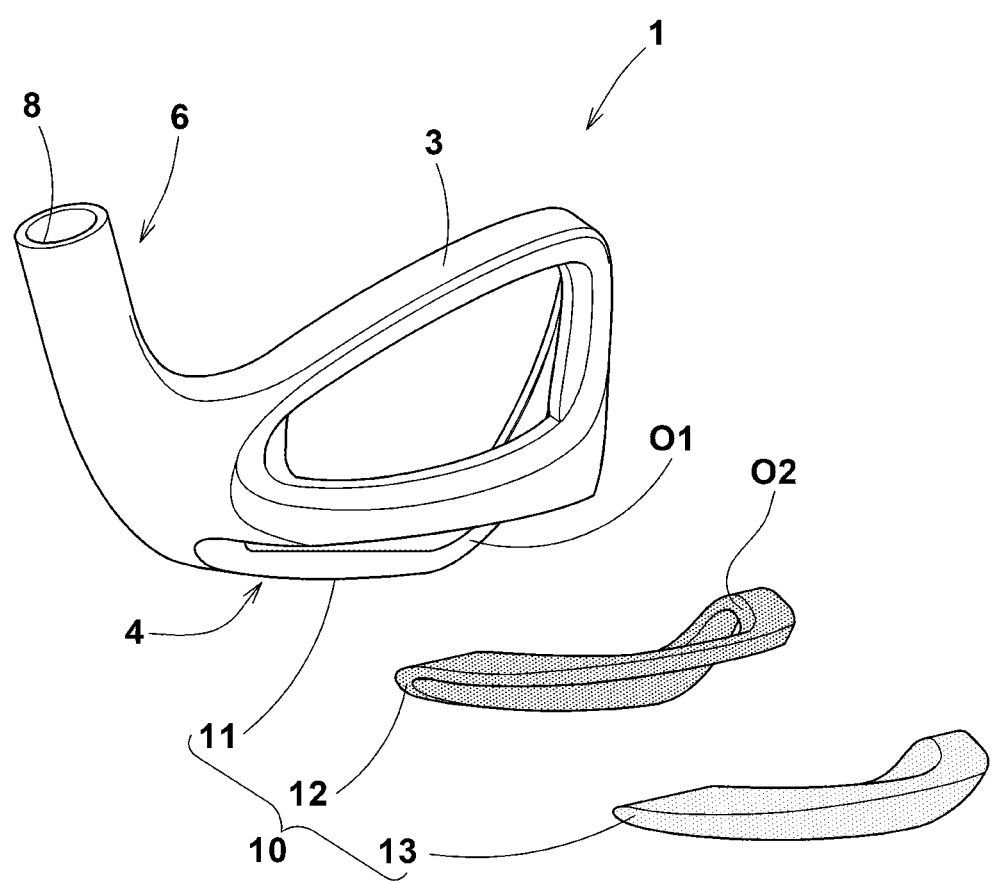
FIG. 7 is an exploded perspective view of the golf club head of FIG. 1.

FIGS. 6 and 7 show an exploded bottom view of the head 1 and an exploded perspective view as seen from the rear of the head, respectively.

As shown in FIGS. 5 to 7, the first member 11 extends backward of the head from the face portion 2 and constitutes a part of the first wall portion 10.

The first member 11 in this embodiment constitutes a major part of sole wall portion 4.

Preferably, the sole wall portion 4 is provided with a first hole O1 penetrating through the sole wall portion 4 in its thickness direction.

In the example shown in FIG. 6, the first hole O1 extends long in the toe-heel direction than the front-back direction.

And the first member 11 forms a part of the sole wall portion 4 surrounding the first hole O1.

As shown in FIG. 5, the first hole O1 in this example penetrates through the sole wall portion main body 4A in the up-down direction of the head.

However, as another example, the first hole O1 may be formed within the rising portion 4B, or in both the sole wall portion main body 4A and the rising portion 4B.

The first material constituting the first member 11 is not particularly limited, but in the present embodiment, it is the same as a main material constituting the major part of the head 1. Here, the "main material" means a material of a part (major part) having the largest volume among the parts constituting the head 1.

The main material in this embodiment is stainless steel (specific gravity about 7.4).

Therefore, the first material's specific gravity $\rho 1$ in this embodiment is about 7.4.

The second member 12 is made of a second material having a specific gravity different from the first material of the first member 11, for example. In this embodiment, the second material has a specific gravity $\rho 2$ greater than the first material. Therefore, the second member 12 can distribute a larger mass to the sole wall portion 4, and the center of gravity of the head 1 can be lowered.

The second material in this embodiment is an alloy comprising W (tungsten), preferably a tungsten-nickel-iron alloy comprising W, Ni and Fe. Such alloy can be increased in the specific gravity by increasing the proportion of W in its chemical composition.

Although not particularly limited, it is preferable for lowering the center of gravity of the head that the second material's specific gravity $\rho 2$ is larger than the first material's specific gravity $\rho 1$ by at least 1.0, more preferably at least 1.5, still more preferably at least 2.0.

In the present embodiment, the second member 12 is fitted into the first hole O1 of the first member 11, and the boundary portion therebetween is welded and fixed to each other. In FIG. 5, as described above, the weld bead or fused metal is shown in solid black.

If the specific gravity difference ($|\rho 2-\rho 1|$) between the second material and the first material becomes large, there is a possibility that welding with sufficient joint strength between them cannot be obtained. From such a viewpoint, the upper limit of the second material's specific gravity $\rho 2$ should be limited to the extent that welding with the first material is possible with sufficient strength.

The difference ($|\rho 2-\rho 1|$) in the specific gravity between the second material and the first material is, for example, set to be 2.5 or less, preferably 2.0 or less.

In the present embodiment, the second member 12 is formed in a ring shape having a second hole O2.

In the example shown in FIGS. 5 to 7, the second member 12 is provided with the second hole O2 penetrating in the up-down direction of the head.

The second hole O2 also extends long in the toe-heel direction than the front-back direction of the head as shown in FIG. 6.

The third material in the present embodiment has a specific gravity $\rho 3$ larger than the first material's specific gravity $\rho 1$ and the second material's specific gravity $\rho 2$. That is, in this embodiment, the first material's specific gravity $\rho 1$, the second material's specific gravity $\rho 2$, and the third material's specific gravity $\rho 3$ satisfy the following condition (1):

$$\rho 1 < \rho 2 < \rho 3 \tag{1}.$$

The difference ($|\rho 3-\rho 1|$) in the specific gravity between the third material and the first material is larger than the difference ($|\rho 2-\rho 1|$) in the specific gravity between the second material and the first material.

Therefore, the third material can distribute a larger mass to the sole wall portion 4 together with the second material, and can further lower the position of the center of gravity of the head 1.

The third material in this embodiment is an alloy containing W (tungsten), preferably a tungsten-nickel-iron alloy comprising W, Ni and Fe, like the second material.

Although not particularly limited, it is preferable for lowering the position of the center of gravity of the head, that the third material's specific gravity is greater than the first material's specific gravity $\rho 1$ by at least 3.0, more preferably at least 4.0, still more preferably at least 5.0.

Since the third material has a large difference ($|\rho 3-\rho 1|$) in the specific gravity from the first material, there is a possibility that the third material is difficult to weld with the first material with sufficient practical strength.

For example, when the third material and the first material are metal materials which cannot be welded to each other, the third member 13 is united with the first member 11 by fixing the third member 13 made of the third material to the second member 12. That is, the first member 11 and the third member 13 having a difference ($\rho 3-\rho 1$) in the specific gravity increased to the extent that welding is difficult are united with each other by interposing the second member 12.

It is preferable that the second member 12 and the third member 13 are prepared as an assembly by uniting them in advance, and then, the second member 12 of this assembly is fixed to the first member 11 prepared in advance by welding to manufacture the head 1.

In this case, the assembly can be efficiently prepared as an integral structure, for example, by sinter bonding the second member 12 and the third member 13.

As another example of the assembly, the third member 13 may be fixed to the second member 12 by welding.

If the difference ($\rho 3-\rho 2$) in the specific gravity between the third material and the second material is smaller than the difference ($\rho 3-\rho 1$) in the specific gravity between the third material and the first material, then, depending on the combination of the materials, these may be welded with each other. In this case, the third member 13 and the second member 12 are united through the welded portion.

Incidentally, when the third member 13 and the second member 12 are weldable with each other, both do not necessarily need to be prepared as the assembly beforehand.

As shown in FIG. 5, the third member 13 includes the continuous portion from the first surface S1 to the opposite second surface S2 in the thickness direction of the first wall portion 10. That is, the third member 13 in this embodiment is exposed in both of the first surface S1 or a bottom surface of the sole wall portion 4, and the second surface S2 or an upper surface (surface facing the cavity C) of the sole wall portion 4. Therefore, the third member 13 can be arranged in a wider range (particularly on the bottom side) in the thickness direction of the first wall portion 10.

such head 1 can provide a greater mass to the sole wall portion 4, and thus can further lower the position of the center of gravity.

It is preferable that the position of the center of gravity of the head in the reference state, is at a height of not more than 17.0 mm, more preferably not more than 16.5 mm when measured from the center of gravity of the head to the horizontal plane HP in the up-down direction of the head.

Preferably, the third member 13 comprises an insert portion 13a disposed within the second hole O2 of the second member 12 as shown in FIG. 5.

The insert portion 13a in this embodiment is arranged so as to contact only the second hole O2 of the second member 12 and not to contact other parts, particularly the first member 11.

In the present embodiment, the third member 13 and the first member 11 are made of the materials which are difficult to weld directly with each other, therefore, if an interface is formed between them, sufficient joint strength cannot be obtained there. This is not preferable. On the other hand, since the third member 13 in this embodiment does not have an interface with the first member, it is firmly joined by using the second member 12.

Further, both the first hole O1 and the second hole O2 are decreased in the aperture area toward the same direction (in this example, toward the second surface S2) as shown in FIG. 5. Correspondingly, the dimension in the front-rear direction of the head, of the insert portion 13a of the third member 13 increases toward the first surface S1. Owing to such configuration, the center of gravity of the third member 13 can be located at a lower position, which helps to lower the position of the center of gravity of the head.

When the second member 12 and the third member 13 are assembled in advance, the assembly is fitted into the first hole O1 from the bottom side of the head, and the first member 11 and the second member 12 of the assembly are fixed by welding so that the third member 13 continues from the first surface S1 to the second surface S2.

Various Modifications of First Embodiment

Figure 8:
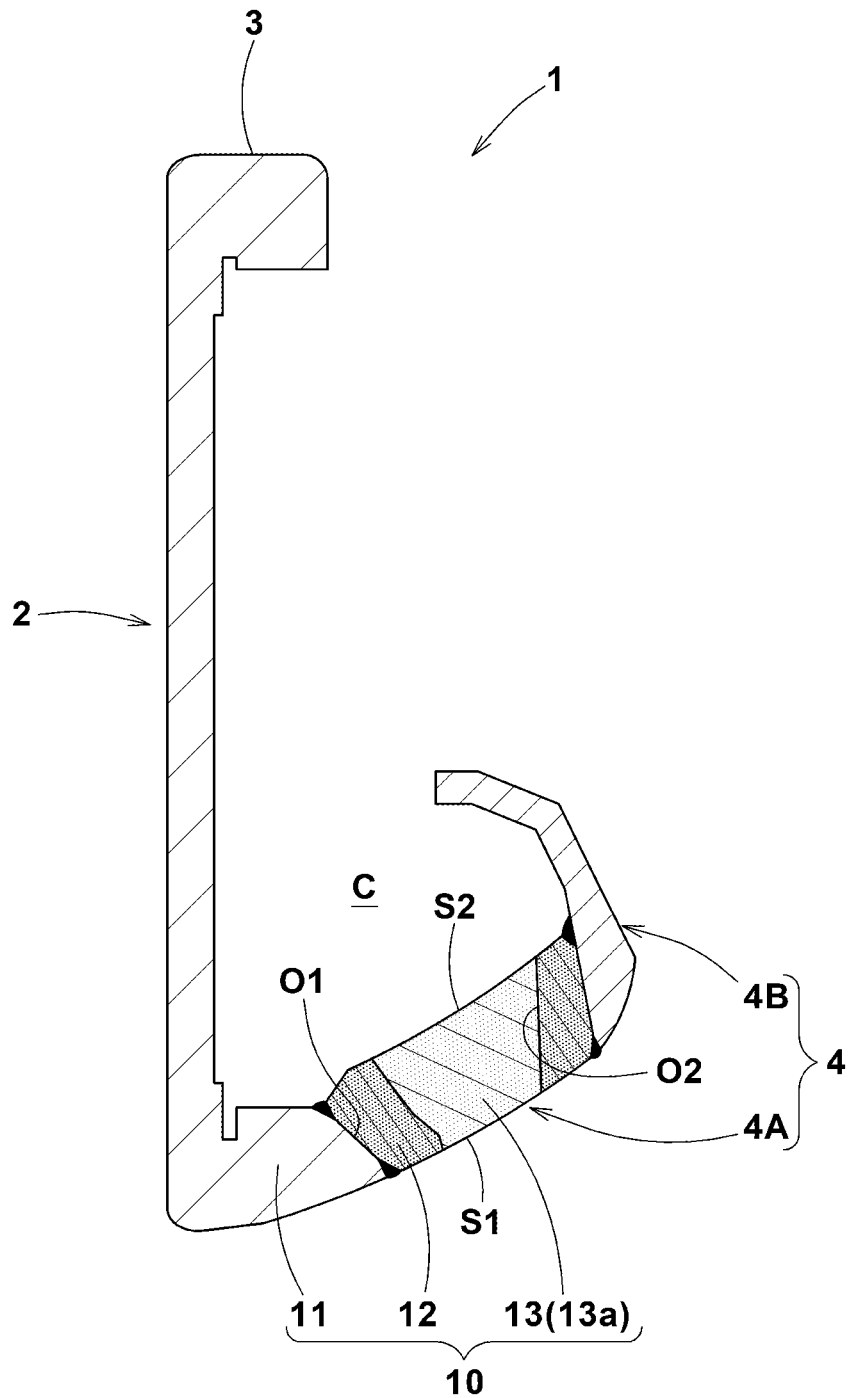
FIG. 8 is a cross-sectional view of a golf club head showing a modification of the first embodiment.

FIG. 8 shows a sectional view showing a modification of the head 1 of the first embodiment taken a line corresponding to the line A-A in FIG. 2.

In the example of FIG. 8, both the first hole O1 and the second hole O2 are decreased in the aperture area toward the same direction (in this example, toward the first surface S1). Corresponding to this, the dimension in the front-rear direction of the head, of the insert portion 13a of the third member 13 decreases toward the first surface S1.

In this example, when the second member 12 and the third member 13 are assembled beforehand, the assembly is fitted into the first hole O1 from the cavity C side, and then the first member 11 and the second member 12 are welded with each other.

Figure 9:
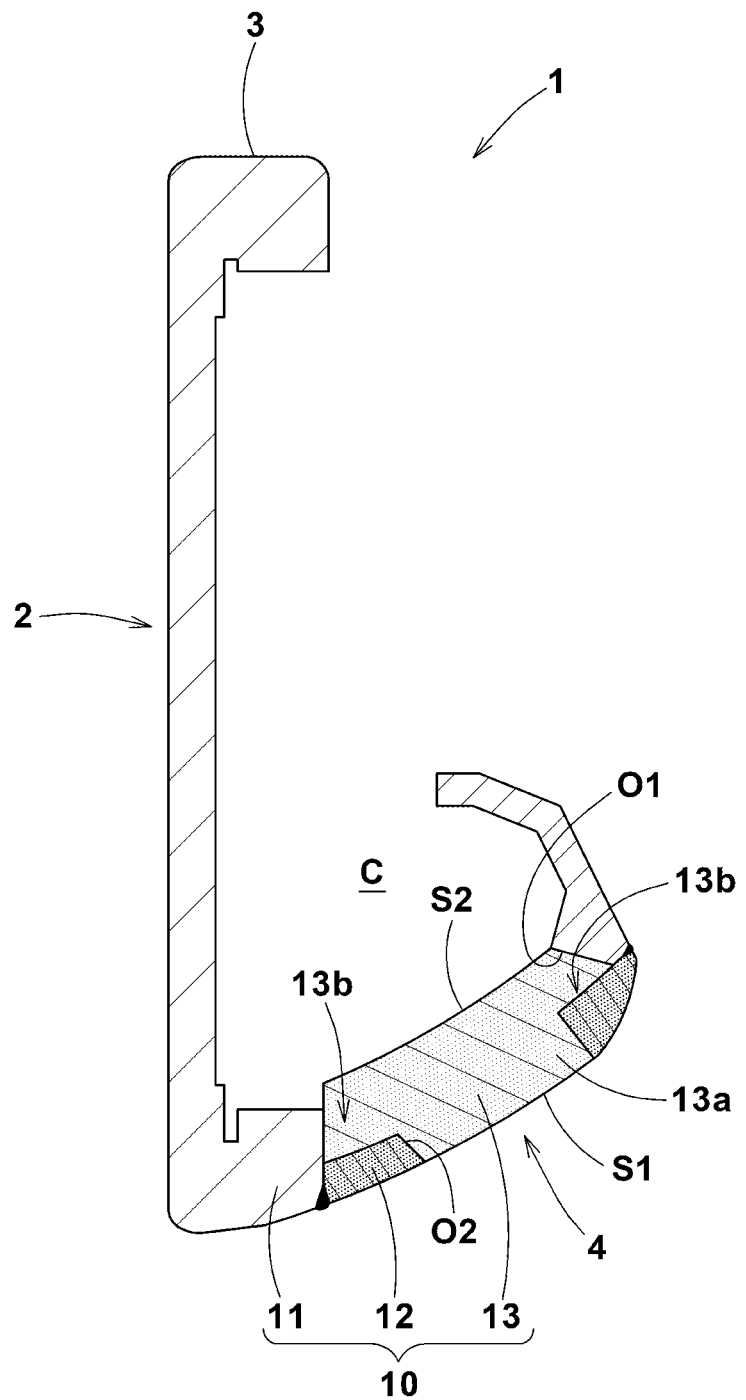
FIG. 9 is a cross-sectional view of a golf club head showing a modification of the first embodiment.

FIG. 9 is a cross-sectional view showing a further modification of the head 1 of the first embodiment taken along a line corresponding to the line A-A in FIG. 2.

In the example of FIG. 9, the thickness of the second member 12 in the thickness direction of the first wall portion 10 is smaller than the total thickness of the first wall portion 10. Further, the second member 12 in this embodiment is arranged toward one of the first and second surfaces S1 and S2 of the first wall portion 10 (for example, toward the first surface S1).

Corresponding to the shape of the second member 12, the third member 13 in this embodiment comprises the insert portion 13a and a protruding portion 13b protruding outside from the second hole O2 of the second member 12, and the protruding portion 13b is fixed to a surface of the second member 12 (in this embodiment, fixed to the upper surface of the second member 12).

The protruding portion 13b of the third member 13 is supported on an upper side of the first hole O1.

Further, in this example, the aperture area of the first hole O1 and the aperture area of the second hole O2 are respectively decreased toward different directions in the thickness direction of the first wall portion 10.

That is, the first hole O1 has an aperture area decreasing toward the top of the head (toward the second surface S2), while the second hole O2 has an aperture area decreasing toward the bottom of the head (toward the first surface S1). Therefore, the insert portion 13a of the third member 13 is restrained from moving toward the first surface S1 by the second hole O2, while the protruding portion 13b is restricted from moving toward the second surface S2 by the first hole O1.

Thus, in this example, the third member 13 is restrained in the movements toward both sides in the thickness direction of the first wall portion 10 by the physical engagement with the first hole O1 and the second hole O2. Accordingly, the third member 13 is more reliably held in the head 1.

In FIG. 9, for example, when the second member 12 and the third member 13 are assembled beforehand, the assembly is fitted into the first hole O1 from the bottom side of the head, and then the first member 11 and the second member 12 are welded.

In FIG. 9, for example, the second member 12 and the third member 13 may be prepared as separate members.

In this case, the third member 13 is first fitted into the first hole O1. Then, the second member 12 is fitted into the remaining space of the first hole O1. As a result, the third member 13 is sandwiched between the first member 11 and the second member 12, and the third member 13 becomes such a state that it has the continuous portion from the first surface S1 to the second surface S2 in the thickness direction of the first wall portion 10. Thereafter, the boundary portion between the first member 11 and the second member 12 is fixed by welding, and the head 1 is manufactured. In this embodiment, the third member 13 is not directly joined to the first member 11, but it is firmly fixed to the first member 11 using the second member 12.

Figure 10:
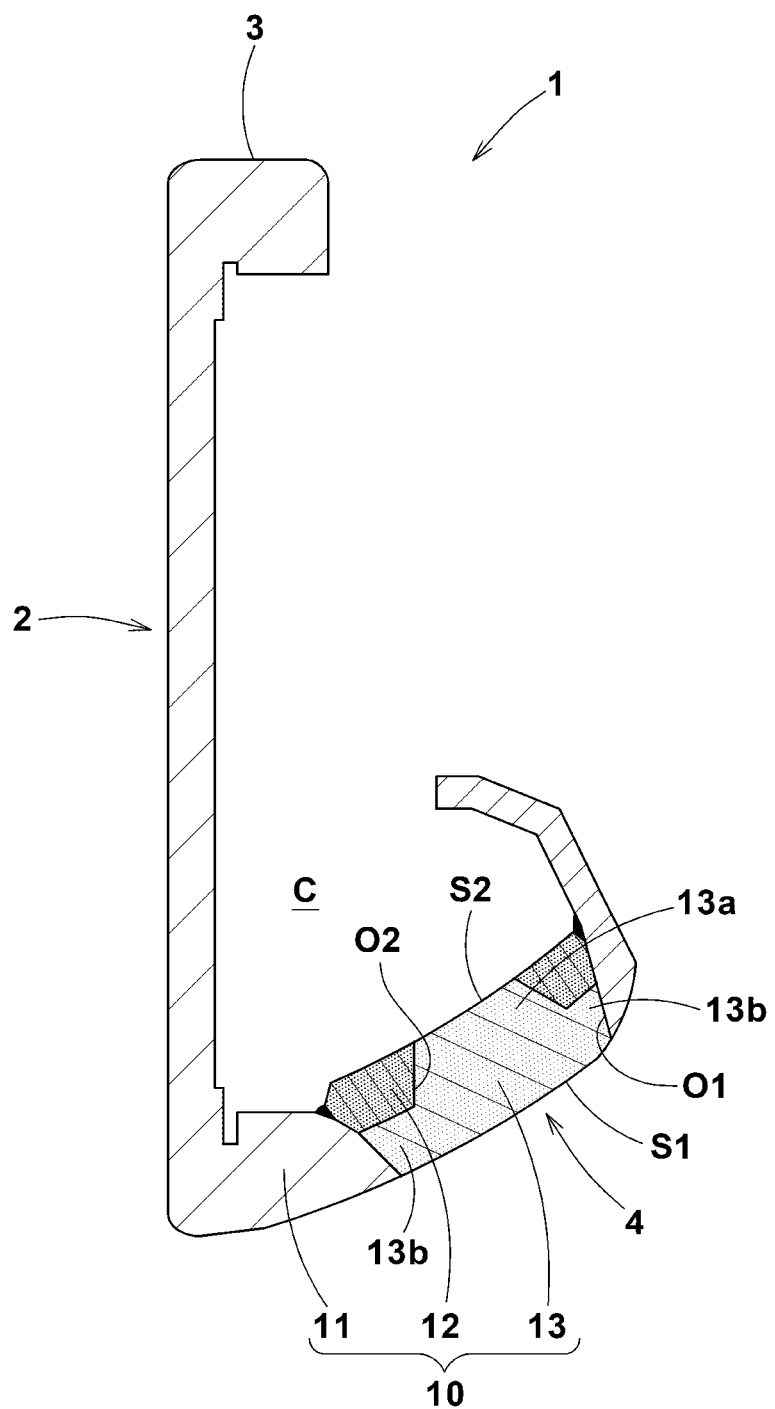
FIG. 10 is a cross-sectional view of a golf club head showing a modification of the first embodiment.

FIG. 10 shows a cross-sectional view showing a further modification of the head 1 of the first embodiment taken along a line corresponding to the line A-A in FIG. 2.

In the example shown in FIG. 10, the thickness of the second member 12 is formed as being small in the thickness direction of the first wall portion 10. Further, the second member 12 in this embodiment is arranged toward the second surface S2 of the first wall portion 10.

Corresponding to the shape of the second member 12, the third member 13 in this embodiment comprises the insert portion 13a, and a protruding portion 13b protruding outside from the second hole O2 of the second member 12. The protruding portion 13b is fixed to a surface of the second member 12 (in this embodiment, the lower surface of the second member 12). The protruding portion 13b of the third member 13 is held on the bottom surface Side of the head, of the first hole O1.

In this example too, the aperture area of the first hole O1 and the aperture area of the second hole O2 respectively decrease toward different directions from each other in the thickness direction of first wall portion 10.

That is, the first hole O1 has an aperture area decreasing toward the head's bottom or toward the first surface S1, while the second hole O2 has an aperture area decreasing toward the head's upper side or toward the second surface S2.

Therefore, the movement of the insert portion 13a of the third member 13 toward the second surface S2 is restricted by the second hole O2. On the other hand, the protruding portion 13b of the third member is restrained from moving toward the first surface S1 by the first hole O1.

Accordingly, in this example too, as in the example of FIG. 9, the third member 13 is restrained in the movements toward both sides in the thickness direction of the first wall portion 10 by the physical engagement with the first hole O1 and the second hole O2. And the third member 13 is more reliably held in the head 1.

In FIG. 10, the second member 12 and the third member 13 may be an assembly integrated by sinter bonding or the like.

As another example, the second member 12 and the third member 13 may be prepared as separate parts, and the third member 13 may be fixed by being sandwiched between the first member 11 and the second member 12.

Figure 11:
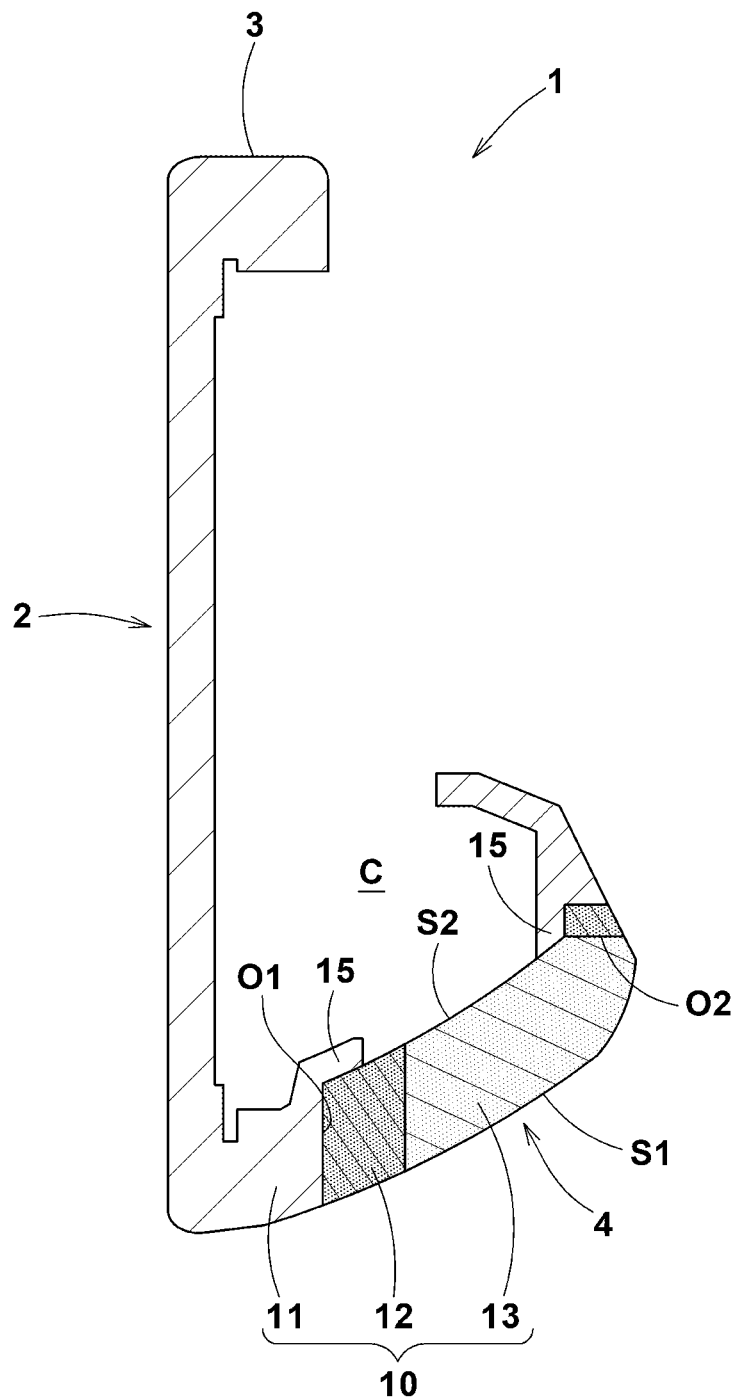
FIG. 11 is a cross-sectional view of a golf club head showing a modification of the first embodiment.

FIG. 11 shows a cross-sectional view showing a further modification of the head 1 of the first embodiment taken a line corresponding to the line A-A in FIG. 2.

The example of FIG. 11 differs from the example of FIG. 5 in that a receiving portion 15 is provided. The receiving portion 15 is provided on the first member 11 and functions as a backing member when the second member 12 is inserted into the first hole O1 of the first member 11. Thereby, the position of the second member 12 and the third member 13 becomes more stable.

As another modification of the first embodiment, the specific gravities $\rho 1$ to $\rho 3$ of the first material to third material may be set to satisfy the following condition (2):

$$\rho 1 = \rho 2 < \rho 3 \qquad (2).$$

In this case, the first member 11 and the second member 12 can be made of materials having the same or very similar chemical components. Therefore, such advantage that the first member 11 and the second member 12 can be welded with each other with high strength, can be obtained.

On the other hand, the third member 13 is fixed to the first member 11 by the above-described various methods using the second member 12.

As still another modification, the specific gravities $\rho 1$ to $\rho 3$ may be set to satisfy the following condition (3):

$$\rho 2 < \rho 1 < \rho 3 \qquad (3).$$

In this case, for example, a weight margin is obtained by the second material, and the third member 13 can be made heavier.

Although the specific gravity difference between the second member 12 and the third member 13 becomes larger, the third member 13 can be fixed to the first member 11 by the various methods described above using the second member 12.

In the foregoing embodiments, although the first wall portion 10 constitutes the sole wall portion 4, the first wall portion 10 may constitute other portions, for example, the top portion 3, or a wall portion extending backward of the head from the toe 5 and/or the heel.

Second Embodiment

Next, a second embodiment of the present invention will be described. This embodiment is suitable for providing a deeper center of gravity of the head, for example.

Figure 12:
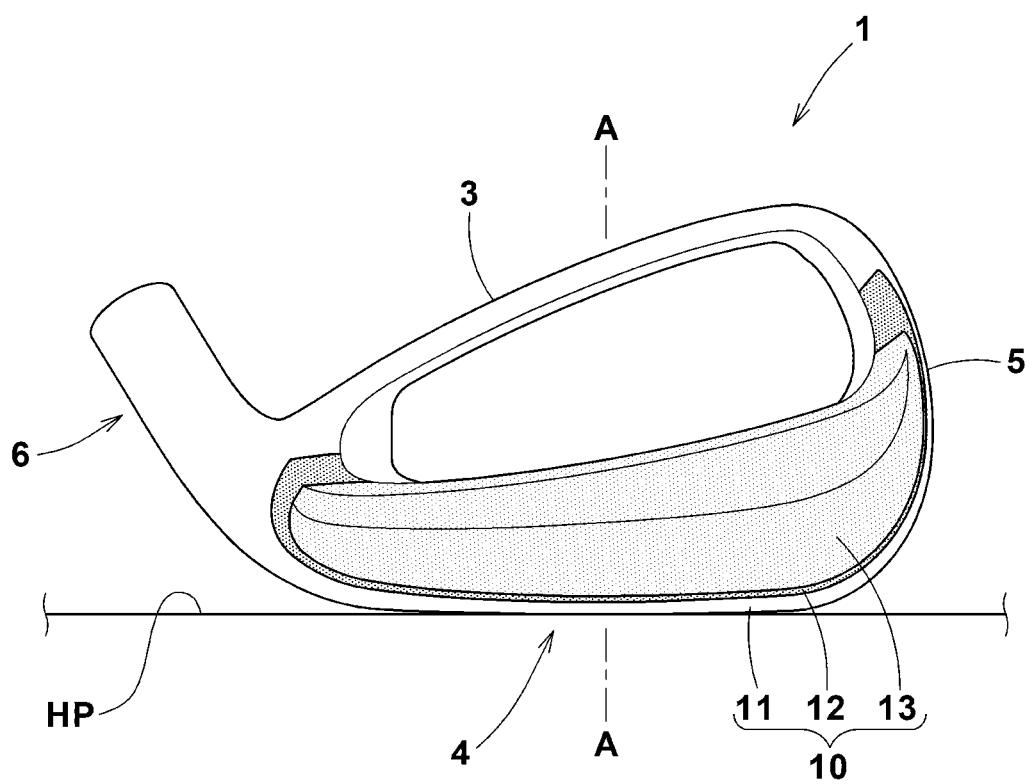
FIG. 12 is a rear view of a golf club head showing a second embodiment of the present invention.
Figure 13:
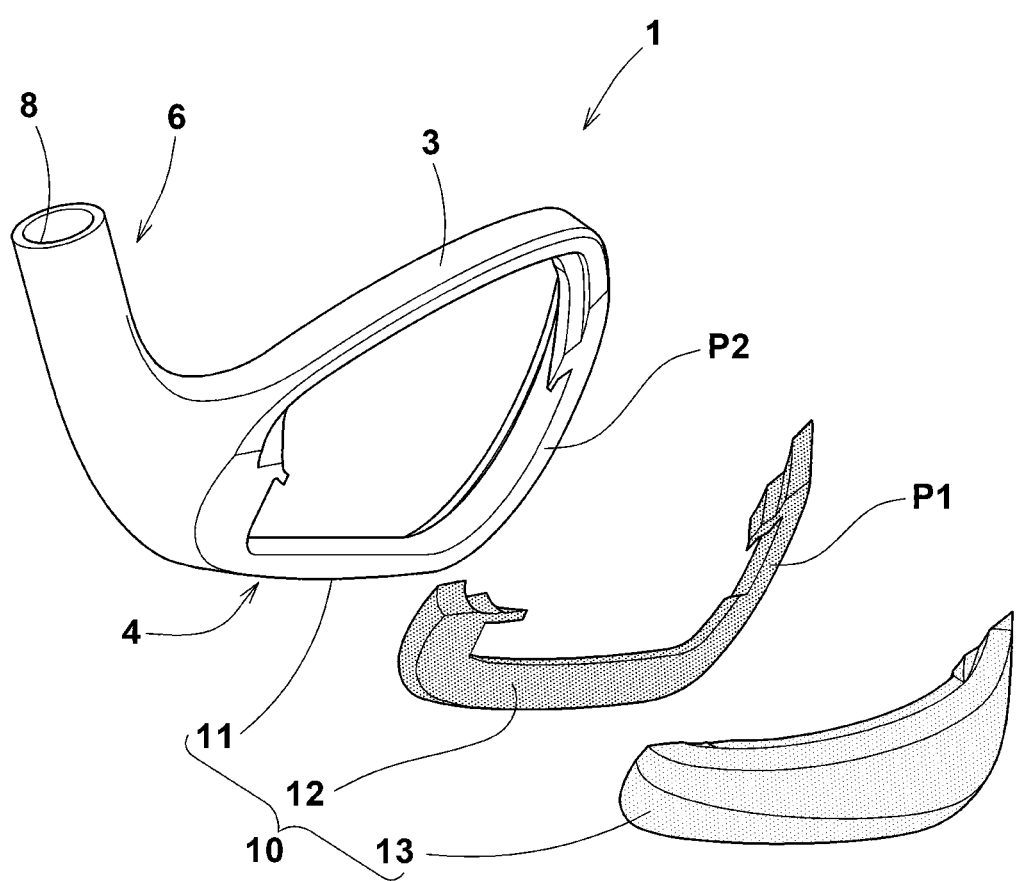
FIG. 13 is an exploded perspective view showing the golf club head of FIG. 12.
Figure 14:
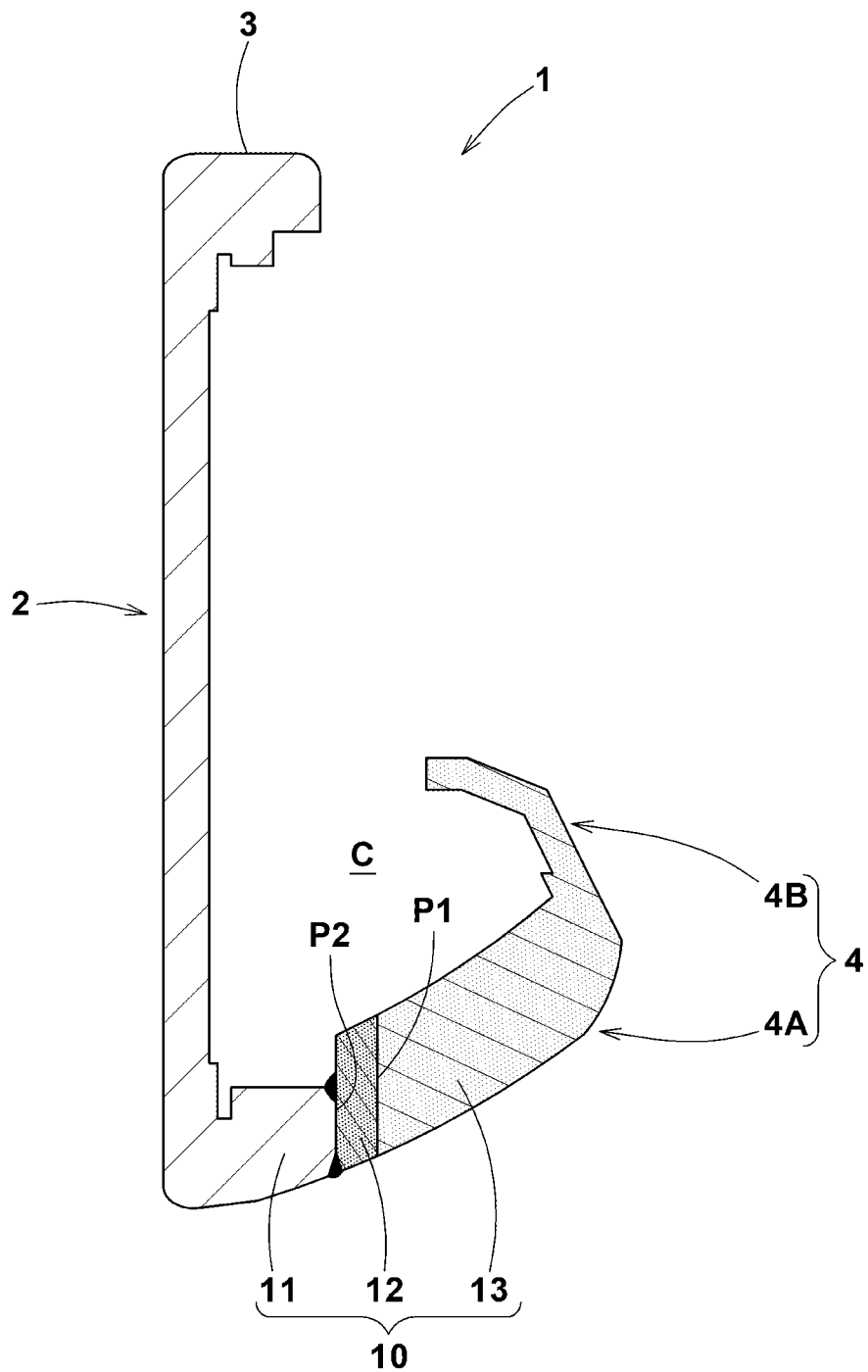
FIG. 14 is a cross-sectional view taken along line A-A in FIG. 12.

FIGS. 12 to 14 are a rear view, an exploded perspective view, and a cross-sectional view taken along line A-A in FIG. 12, respectively, of the head 1 as the second embodiment of the present invention.

In the first wall portion 10 of this embodiment, the third member 13 is held at a joint surface P1 with the second member 12 in a cantilever manner so as to extend backward of the head as shown in FIGS. 12 to 14. Namely, the rear side than the joining surface P1 with the second member 12 is composed of only the third member 13 having the largest specific gravity.

Thus, when the specific gravities $\rho 1$ to $\rho 3$ satisfy the above conditions (1) to (3), more mass can be distributed backward of the head 1 in this embodiment, therefore, it is possible to provide a deeper center of gravity of the head.

In this embodiment, the joint surface P1 between the second member 12 and the third member 13 extends in the toe-heel direction along the club face 2a, but is not limited to this example.

Preferably, the second member 12 and the third member 13 may be united in advance by sinter bonding, welding, or the like and prepared as a assembly.

The second member 12 of the assembly is fixed to a joint surface P2 on the back side of the first member 11 by welding.

The joint surface P2 also extends in the toe-heel direction along the club face 2a in this example.

Third Embodiment

Next, a third embodiment of the present invention will be described. This embodiment is suitable for reducing the mass of the upper part of the head, for example.

Figure 15:
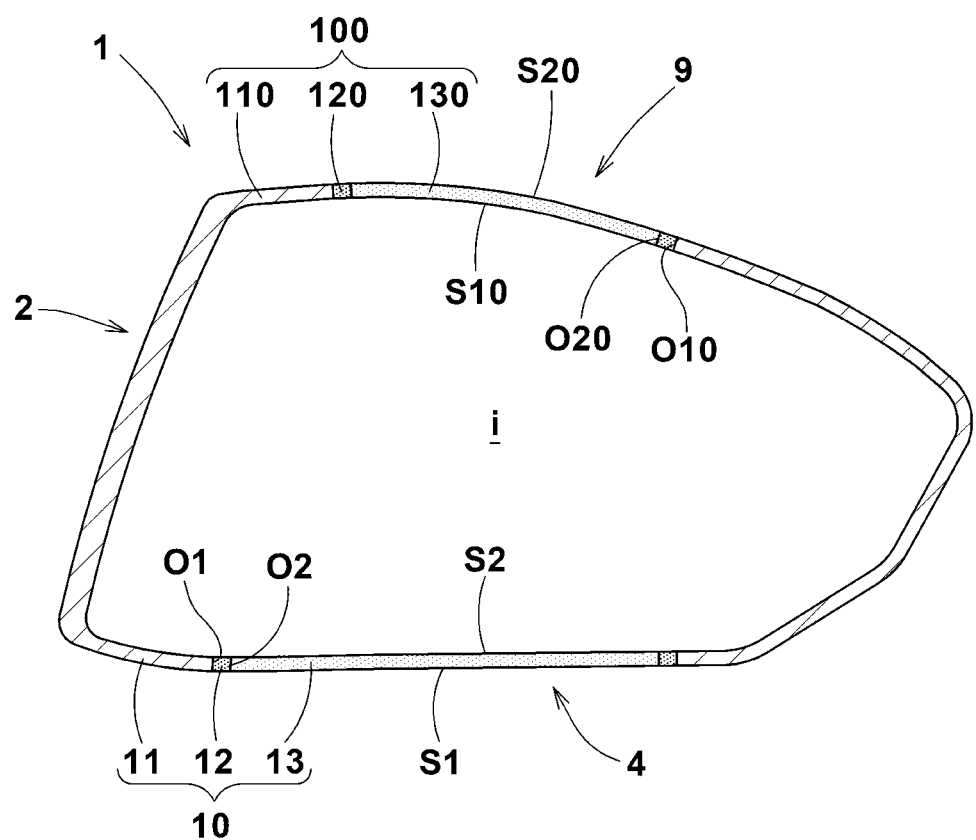
FIG. 15 is a cross-sectional view of a golf club head showing a third embodiment of the present invention.
Figure 16:
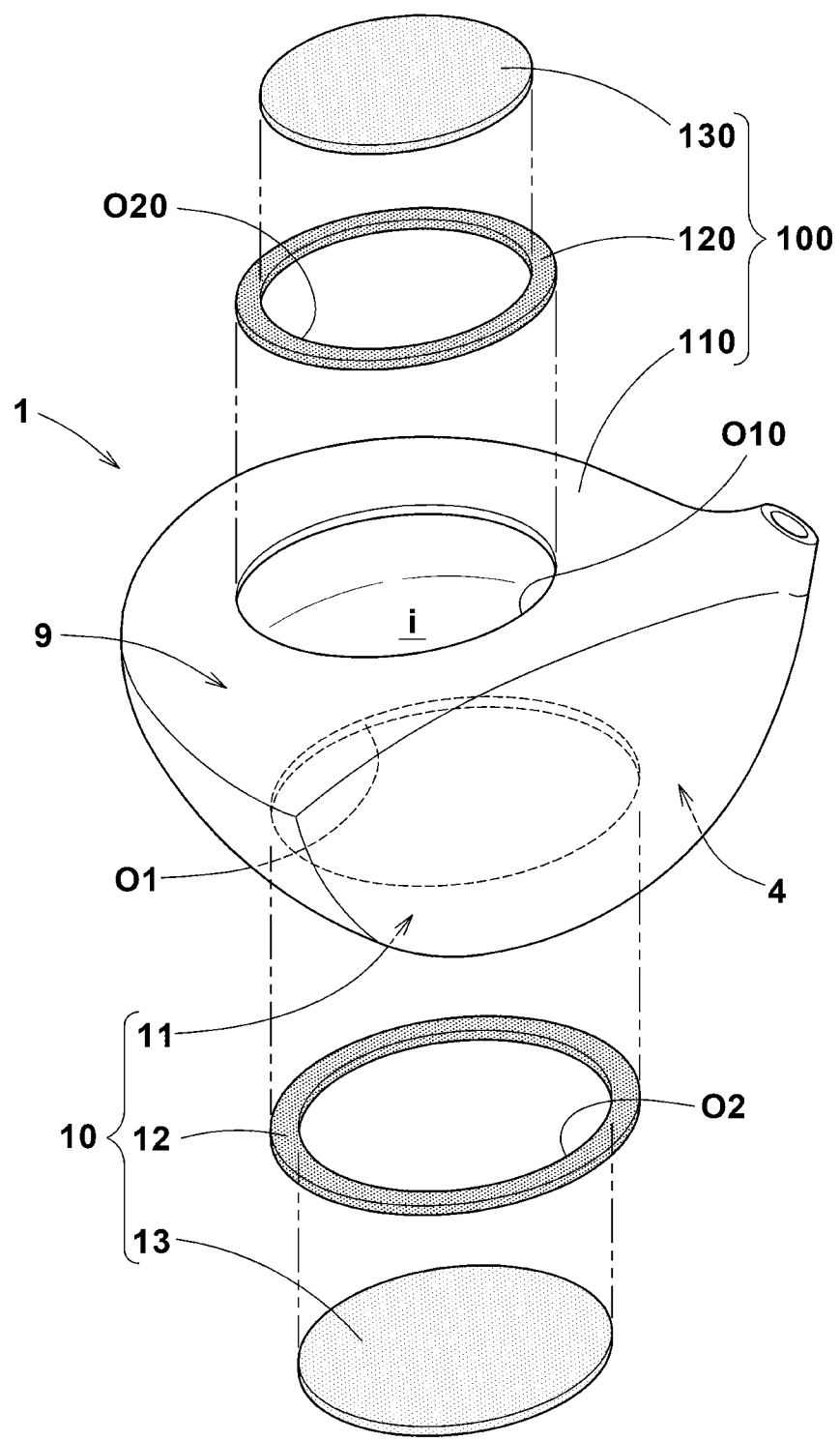
FIG. 16 is an exploded perspective view of the golf club head of the third embodiment.

FIGS. 15 and 16 show a cross-sectional view and an exploded perspective view of the head 1 of the third embodiment, respectively.

In this embodiment, the head 1 is a wood type golf club head having a substantially closed cavity (i) therein.

The head 1 comprises a face portion 2, a sole wall portion 4, and a crown wall portion 9 that extends backward of the head from the top of the face portion 2.

In this embodiment too, the sole wall portion 4 may be formed as the first wall portion 10 although it is optional. That is, the sole wall portion 4 comprises the first member 11, the second member 12 and the third member 13 as described above. In this embodiment, the first member 11 constitutes a peripheral part of the sole wall portion 4 surrounding the first hole O1. The second member 12 is a ring having the second hole O2 and is fixed to the edge of the first hole O1 by welding, for example. The third member 13 is a plate united with the second member 12 so as to close the second hole O2, for example.

Thereby, the third member 13 continues from the first surface S1 to the second surface S2 on the opposite side in the thickness direction of the first wall portion 10 (sole wall portion 4). Here again, it is desirable that the first material's specific gravity $\rho 1$, the second material's specific gravity $\rho 2$ and the third material's specific gravity $\rho 3$ satisfy any of the conditions (1) to (3) as described above.

For example, the first material of the first member 11 is a titanium alloy (specific gravity less than 5.0), and the second material of the second member 12 is a low specific gravity iron alloy (specific gravity 5.5 to 7.5), and the third material of the third member 13 is an iron alloy (SUS630, specific gravity 7.8).

It is preferable that the third member 13 is united (assembled) with the second member 12 in advance by sinter bonding or the like. As a result, the third member 13 (third material), whose specific gravity is increased to the extent that it cannot be welded directly with the first member 11 (first material), can be fixed to the first member 11 by the second member 12. Therefore, this embodiment can be provided the wood type head 1 having a low center of gravity of the head.

In the third embodiment, the crown wall portion 9 is the first wall portion 100 (here, reference numeral 100 is used to distinguish it from the first wall portion 10 of sole wall portion 4). That is, as shown in FIGS. 15 and 16, the crown wall portion 9 includes the first member 110, the second member 120 and the third member 130 as described above.

The first member 110 constitutes a peripheral part of the crown wall portion 9 surrounding the first hole O10.
The second member 120 is a ring having the second hole O20, and is fixed to the edge of the first hole O10 by welding, for example. The third member 130 is a plate united with the second member 120 so as to close the second hole O20 of the second member 120, for example.
Accordingly, the third member 130 is continuous from the first surface S1 to the opposite second surface S2 in the thickness direction of the first wall portion 100 (crown wall portion 9). Here, it is preferable for the first wall portion 100 that the first material's specific gravity $\rho 1$ of the first member 110, the second material's specific gravity $\rho 2$ of the second member 120 and the third material's specific gravity $\rho 3$ of the third member 130 satisfy the following condition (4):

$$\rho 1 > \rho 2 > \rho 3 \qquad (4).$$

For example, the first material of the first member 110 is a titanium alloy. The second material of the second member 120 is an aluminum alloy. The third material of the third member 130 is a CFRP. In this case, the aluminum alloy and CFRP may be united with each other by adhesion, or a part of CFRP may be melted and united to the aluminum alloy.

In particular, it is preferable that the third member 130 having the smallest specific gravity is made of the third material having the specific gravity which is reduced to such an extent that it can not be welded to the first member 110. Examples of such third materials include aluminum alloys and magnesium alloys in addition to CFRP.
In such crown wall portion 9, the third member 130 (third material) whose specific gravity is reduced to the extent that it cannot be welded directly to the first member 110 (first material), can be united with the first member 110 by the use of the second member 120.
In this embodiment, therefore, the weight in an upper part of the head (crown wall portion 9) is significantly reduced, so the wood type head 1 having a lower center of gravity of the head can be obtained.
Further, in such first wall portion 100, more mass is distributed to the outer peripheral part of the first wall portion 100, which is useful for providing a large right-left moment of inertia and a deeper center of gravity of the head. In this sense, the condition (4) of the specific gravities of the first wall portion 100 may be applied not only to the crown wall portion 9 but also to the sole wall portion 4.

While detailed description has been made of preferable embodiments of the present invention, the present invention can be embodied in various forms without being limited to the illustrated embodiment.

Working Examples

Figure 18:
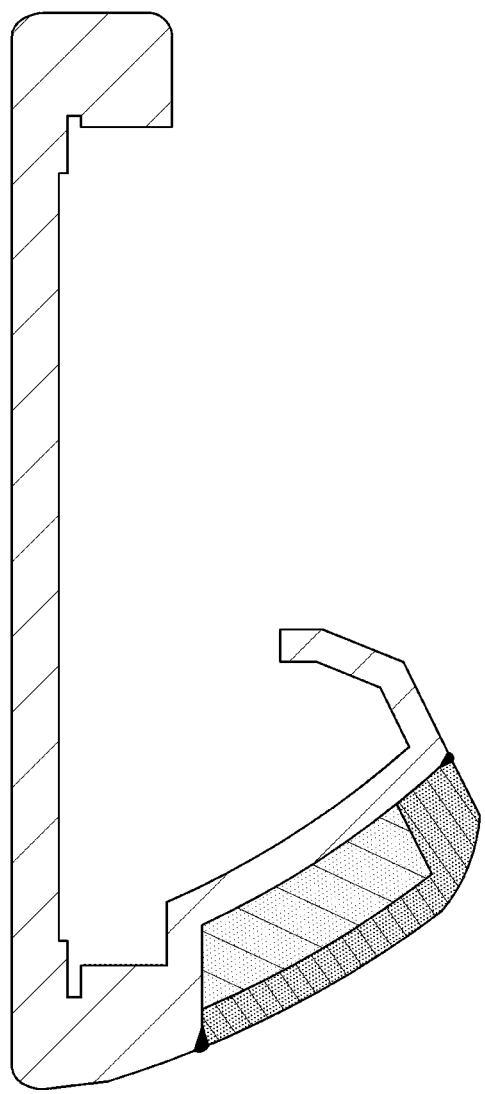
FIG. 18 is a cross-sectional view of a golf club head showing a comparative example.

In order to confirm the effects of the present invention, iron-type golf club heads were experimentally manufactured based on the specifications shown in Table 1, wherein the comparative example was such that, as shown in FIG. 18, a weight member (a third member) was disposed in a sole wall portion by being covered with a second member as described in Patent Document 1 above.

All the heads had the same shape. Although not shown in detail, each face portion was composed of a face plate made of a titanium alloy having a specific gravity of 4.38 and a face frame supporting the face plate, and the face frame was made of the first material.

For the third member, two types A and B with different specific gravities were used.
The specific gravity of each material was as follows.
Specific gravity of first member (first material) $\rho 1$: 7.8
Specific gravity of second member (second material) $\rho 2$: 9.5
Specific gravity of third member A (third material) $\rho 3$: 13.0
Specific gravity of third member B (third material) $\rho 3$: 17.0
Then, the heads were measured for the following characteristics relating to the center of gravity of the head.
[Sweet Spot Height]
The sweet spot height is the vertical distance from the horizontal plane to the sweet spot of the head under its reference state. Here, the sweet spot is an intersecting point between the club face and a straight line drawn normally to the club face from the center of gravity of the head.
In general, the lower the sweet spot height, the higher the hit ball, the less the backspin, and the longer the flight distance of the hit ball.
[Gravity Center Height]
The gravity center height is the vertical distance from the horizontal plane to the center of gravity of the head under its reference state.
In general, the lower the gravity center height, the lower the sweet spot height. Therefore, the hit ball is likely to rise higher, and a longer flight distance is likely to be obtained.
[Gravity Center Depth]
The gravity center depth is the shortest distance from the club face to the center of gravity of the head.
In general, when the gravity center depth is deeper, it is easier to apply backspin to the hit ball.
[Right-Left Moment of Inertia]
The right-left moment of inertia is a moment of inertia of the head around a vertical axis passing through the center of gravity of the head under its reference state.
In general, the larger the right-left moment of inertia, the more stable the directionality of the hit ball.
<Up-Down Moment of Inertia>
The up-down moment of inertia is a moment of inertia of the head around a horizontal axis extending in the toe-heel direction of the head passing through the center of gravity of the head under its reference state.
In general, when the up-down moment of inertia is larger, the variation in the flight distance of the hit ball tends to be more suppressed.
The test results are shown in Table 1.

TABLE 1

| Head | comparative example | working example 1 | working example 2 | working example 3 | working example 4 | working example 5 | working example 6 | working example 7 |
|---|---|---|---|---|---|---|---|---|
| head shape | FIG. 18 | FIG. 5 | FIG. 5 | FIG. 9 | FIG. 10 | FIG. 8 | FIG. 11 | FIG. 14 |
| fixing method for third member | pinch | sinter | sinter | sinter | pinch | pinch | sinter | sinter |

TABLE 1-continued

| Head | comparative example | working example 1 | working example 2 | working example 3 | working example 4 | working example 5 | working example 6 | working example 7 |
|---|---|---|---|---|---|---|---|---|
| face plate's mass (g) | 34.8 | 34.8 | 34.8 | 34.8 | 34.8 | 34.8 | 34.8 | 34.8 |
| first member's mass (g) | 130.4 | 130.4 | 130.4 | 130.4 | 130.4 | 110.8 | — | — |
| second member's mass (g) | 25.2 | 25.5 | 18.8 | 15.9 | 15.9 | 25.5 | 25.5 | 16.6 |
| third member A's mass (g) | 36.0 | 72.5 | — | — | — | 72.5 | 72.5 | 98.1 |
| third member B's mass (g) | — | — | 79.0 | 82.3 | 82.3 | — | — | — |
| Total mass (g) | 263.0 | 263.2 | 263.0 | 263.4 | 263.4 | 263.2 | 263.2 | 260.3 |
| sweet spot height (mm) | 20.1 | 19.5 | 19.3 | 19.1 | 19.0 | 19.5 | 19.5 | 19.4 |
| gravity center height (mm) | 17.2 | 16.4 | 16.2 | 16.1 | 16.0 | 16.4 | 16.4 | 16.3 |
| gravity center distance (mm) | 39.3 | 39.6 | 39.6 | 39.9 | 39.9 | 39.6 | 39.6 | 39.9 |
| gravity center depth (mm)) | 5.9 | 6.3 | 6.3 | 6.2 | 6.3 | 6.3 | 6.3 | 6.5 |
| right-left moment of inertia (g sq · cm) | 2898 | 2888 | 2888 | 2930 | 2945 | 2888 | 2888 | 2961 |
| up-down moment of inertia (g sq · cm) | 752 | 755 | 760 | 755 | 765 | 755 | 755 | 758 |

From the test results, it was confirmed that the golf club heads according to the present invention can provide a lower center of gravity of the head than the head of the comparative example.

DESCRIPTION OF THE REFERENCE SIGNS

1 golf club head
2 face portion
4 sole wall portion
9 crown wall portion
10, 100 first wall portion
11, 110 first member
12, 120 second member
13, 130 third member
13a insert portion
13b protruding portion
O1, O10 first hole
O2, O20 second hole
S1 first surface
S2 second surface

The invention claimed is:

1. A golf club head comprising a face portion, a top portion, a sole wall portion, a toe and a hosel, wherein
the face portion comprises a first material and has a front surface defining a club face for hitting a ball,
the top portion defines an upper surface portion of the head comprising the first material and extending rearward of the head from an upper edge of the club face,
the sole wall portion extends backward of the head from a lower part of the face portion, the sole wall portion provided with a first through-hole which extends in an up-down direction of the head so as to penetrate the sole wall portion in a thickness direction of the sole wall portion from a lower first surface on one side of the sole wall portion to an upper second surface on an opposite side of the sole wall portion in the thickness direction of the sole wall portion, and the sole wall portion comprising a first member extending rearwardly of the head from a lower edge of the club face and made of the first material, a second member made of a second material, and a third member made of a third material,
wherein
the third material's specific gravity is different from the first material's specific gravity and the second material's specific gravity,
wherein
the first member is a part of the sole wall portion surrounding the first through-hole,
the first member is fixed to the second member by welding,
the third member is fixed to the first member by using the second member, and
the third member has a continuous portion which is continuous from the first surface on the one side of the sole wall portion in the thickness direction of the sole wall portion, to the second surface on the opposite side of the sole wall portion in the thickness direction of the sole wall portion.

2. The golf club head according to claim 1, wherein the third member is fixed to the second member.

3. The golf club head according to claim 1, wherein the first material's specific gravity ρ1, the second material's specific gravity ρ2, and the third material's specific gravity ρ3 satisfy the following condition (1):

$$\rho1 < \rho2 < \rho3 \tag{1}$$

4. The golf club head according to claim 1, wherein the first material's specific gravity ρ1, the second material's specific gravity ρ2, and the third material's specific gravity ρ3 satisfy the following condition (2):

$$\rho1 = \rho2 < \rho3 \tag{2}$$

5. The golf club head according to claim 1, wherein the first material's specific gravity ρ1, the second material's specific gravity ρ2, and the third material's specific gravity ρ3 satisfy the following condition (3):

$$\rho2 < \rho1 < \rho3 \tag{3}$$

6. The golf club head according to claim 1, wherein the third member is fixed to the second member by welding.

7. The golf club head according to claim 1, wherein the second member is fixed to an edge of the first through-hole by welding,
the second member is provided with a second through-hole, and
the third member comprises an insert portion placed in the second through-hole.

8. The golf club head according to claim 7, wherein in a cross section of the golf club head taken along a plane parallel to a front-rear direction of the head and orthogonal to a toe-heel direction of the head, inner surfaces of the first through-hole flare toward the first surface side from the second surface side, and inner surfaces of the second through-hole flare toward the first surface side from the second surface side.

9. The golf club head according to claim 1, wherein the first through-hole extends lengthwise from a region proximal the toe to a region proximal the hosel.

10. The golf club head according to claim 6, wherein the first through-hole extends lengthwise from a region proximal the toe to a region proximal the hosel.

11. The golf club head according to claim 1, wherein
the second member is inserted in the first through-hole and fixed to an edge of the first through-hole by welding,
the second member is provided with a second through hole, and
the third member is inserted in the second through hole and fixed to the second member by welding.

\* \* \* \* \*